Dec. 18, 1934.   H. HILSENRATH   1,985,094
DISPENSING DEVICE
Filed April 10, 1931
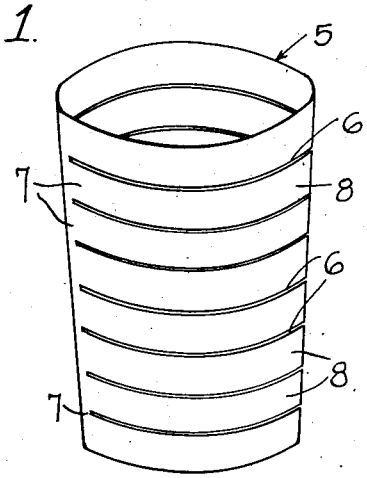
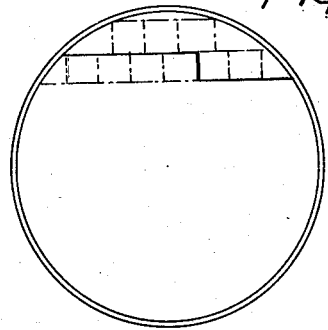
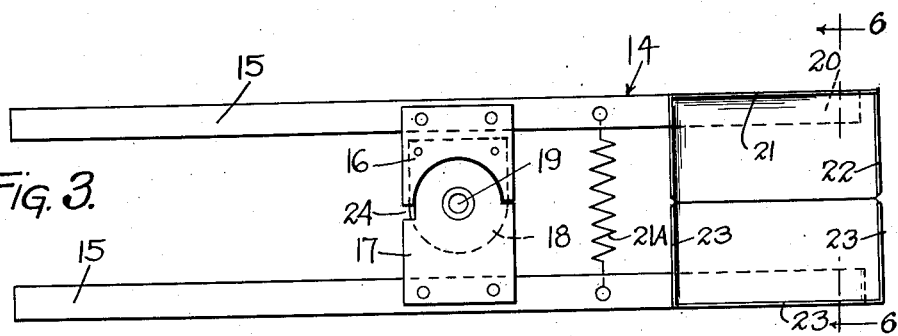
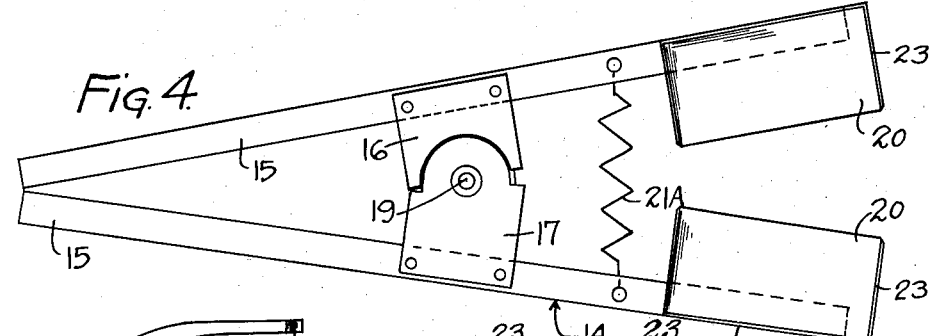
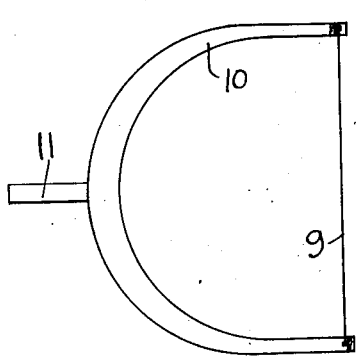
INVENTOR
HARRY HILSENRATH
BY HIS ATTORNEY Patented Dec. 18, 1934

1,985,094

UNITED STATES PATENT OFFICE 1,985,094

DISPENSING DEVICE

Harry Hilsenrath, New York, N. Y.

Application April 10, 1931, Serial No. 529,123

1 Claim. (Cl. 31—31)

This invention relates to plastic material dispensing devices and in particular to one employed in the dispensing of butter in quarter or half pound blocks so that certain advantages are obtained that will be hereinafter set forth.

A particular object of my invention is to provide a device for the dispensing of butter, cheese or like plastic foodstuff without the necessity of wasting time in cutting off small pieces in order to dispense the proper weight as is common in retail stores at the present time.

Another advantage of my invention is that the foodstuff is not touched by the one dispensing the same and considerable time is saved by reason of the fact that the butter, for instance, has been previously cut in layers of predetermined thickness and is simply cut out through the medium of a suitable cutter in the proper size block that eliminates the necessity of weighing, the thickness of the layer and the size of the cutting implement forming a block which will be exactly the proper weight.

It is to be understood that in the specification to follow, while I am making use of an illustration of the device that relates to the cutting of butter in order to bring out the benefits of my invention, it is to be understood that it may be employed in dispensing other things besides foodstuff where time is to be saved in weighing out quantities that are more or less fixed as a standard.

With these and other objects in view, the invention comprises certain constructions hereinafter described and then particularly pointed out in the claim and a preferred embodiment of my invention is illustrated in the accompanying drawing, in which,—

Figure 1 is a view in perspective of a cutting guide through the medium of which the mass to be dispensed can be sliced in layers and accurately.

Figure 2 is a plan view of the top layer of material from which is to be cut blocks of predetermined dimensions and weight.

Figure 3 is a plan view of a cutting implement employed in cutting from the layers of material formed, masses or blocks of predetermined weight.

Figure 4 is a view similar to Figure 3 showing how the implement is opened to release the block of material cut from the layer or mass, and Figure 5 is a view of a cutter employed in layering the mass, this implement being employed in conjunction with the guide illustrated in Figure 1.

Figure 6 is a section taken on the line 6—6 of Figure 3.

Referring to the drawing in detail, 5 indicates a guide which is in the form of a receptacle and into which butter, for instance, is placed when removed from the tub or container in which it is received by the retailer. This guide 5 is preferably made of non-corrosive material and consists of a tapered receptacle slotted as at 6 completely around the periphery thereof with the exception of the small unslotted portion 7 which holds the bands 8 defined by the slots 6 in proper formation.

The slots 6 are spaced apart so that when the implement illustrated in Figure 5, is employed to cut the butter or other material in the receptacle 5, layers are provided throughout the depth of the substance of uniform thickness so that a cutting implement may be employed to remove from each of the layers so formed, a block of either one-half or one-quarter pound weight or more, depending upon the size of the cutting tool.

As many layers may be cut as desired depending upon the number of slots 6 of the receptacle or guide 5 and the bands 8 of the guide form accurate edge guides for the wire 9 which passes through the receptacle 5 to cut the mass within the receptacle. The implement employed in making layers in the mass is well known and consists of a U-shaped frame 10, having a handle 11 and a wire 9 stretched across the legs of the frame, the wire being taut and being thin enough to cut layers in a mass when the wire 9 is passed through the slot 6 of a receptacle 5.

When the butter has been placed in the receptacle 5 and sliced, the receptacle is removed and the material left uncovered or placed into the tub in which it was received and the mass is then ready for cutting up, which is done through the medium of the cutter 14 illustrated in Figures 3 and 4. This cutter consists of the arms 15, each carrying spaced hinge plates 16 and spaced hinge plates 17. The hinge plates 16 have riveted between them, a solid extension piece 18 through which a pivot pin 19 passes as well as through plates 17 to pivotally secure the plates 16 and 17 together so that the arms 15 may be opened and closed to separate cutting receptacle ends 20 carried at their outer ends.

The arms 15 are joined through the medium of a suitable coil spring 21A so that the receptacle ends 20 are normally retained closed as in Figure 3.

These rectangular receptacle ends 20 are provided with longitudinal side walls 21 and transverse end walls 22, the receptacle edges being closely matched so that they fit tightly together to form a complete receptacle, the outer edges 23 of which are sharpened so that the cutter may be forced into the uppermost layer of material until the cutting edges 23 reach the next adjacent layer and a block of butter can then be removed by the cutting implement. When the substance has been removed, it will be in block form and may then be released by squeezing the arms 15 to separate the receptacle ends 20 and permit the block of material to drop out. The plates 16 and 17 are suitably cut as at 24 at one side to permit full operation of the arms 15 toward each other to separate the receptacle ends 20 making up the complete rectangular receptacle.

It is quite evident that through the use of my improved guide receptacle and cutting tool that butter or any such substance may be dispensed in blocks of one-quarter, half or full pound measure without the necessity of weighing or cutting out small pieces of the butter in order to obtain the proper weight.

It is also evident that with an invention of the character described, the hands of the person dispensing the butter does not touch the butter or other foodstuff and consequently, the same is dispensed in a sanitary manner, is accurate in weight and may be conveniently wrapped due to its rectangular shape and even contour.

My invention is not to be restricted to the precise details of construction shown since various changes and modifications may be made therein without departing from the scope of the invention or sacrificing the advantages derived from its use.

What I claim is:—

In a device of the character described, a cutter comprising pivoted arms disposed parallelly in normal relation, a rectangular receptacle end on each arm having cutting edges, the said receptacle ends being arranged to meet and form a complete receptacle, hinge plates carried by the arms, an extension on one of the hinge plates to which the other hinge plate is pivoted, and means for yieldably holding the meeting edges of the receptacle ends in close engagement.

HARRY HILSENRATH. [L. S.]